No. 884,288. PATENTED APR. 7, 1908.
W. NASH.
COOKING APPARATUS.
APPLICATION FILED OCT. 23, 1906.
3 SHEETS—SHEET 1.
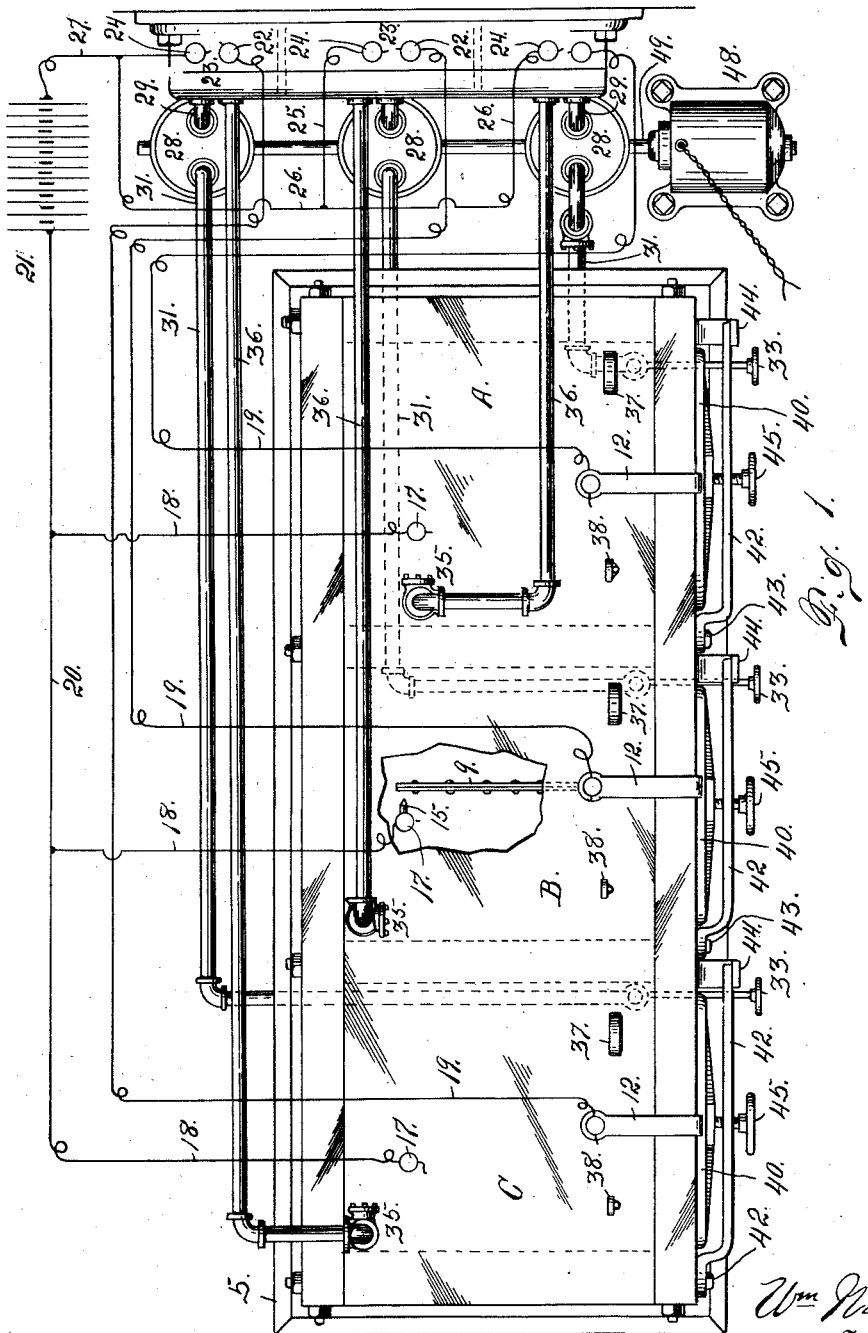
Witnesses
Otto E. Hoddick.
Dena Nelson.
Wm Nash.
Inventor
By
Attorney

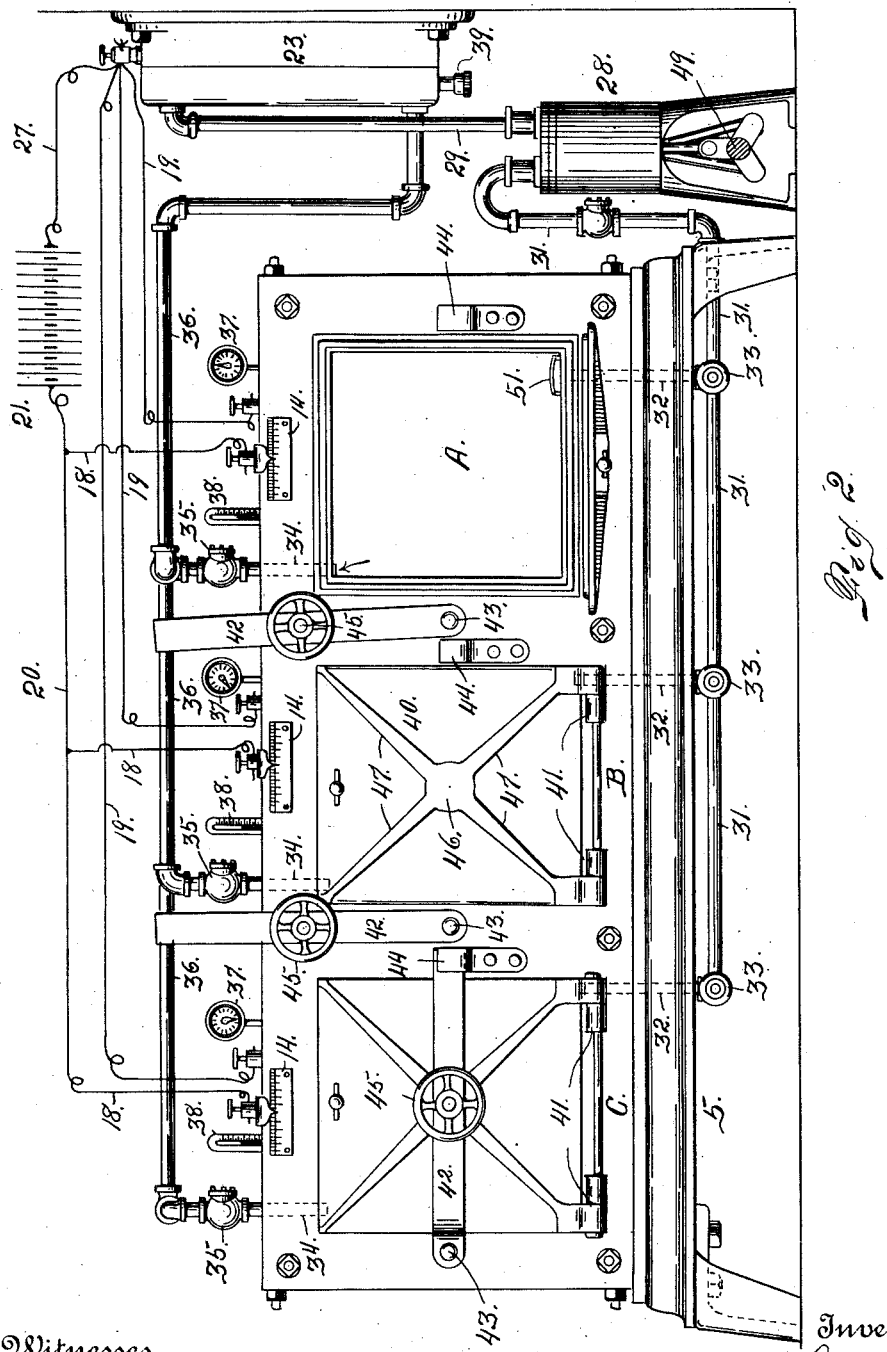

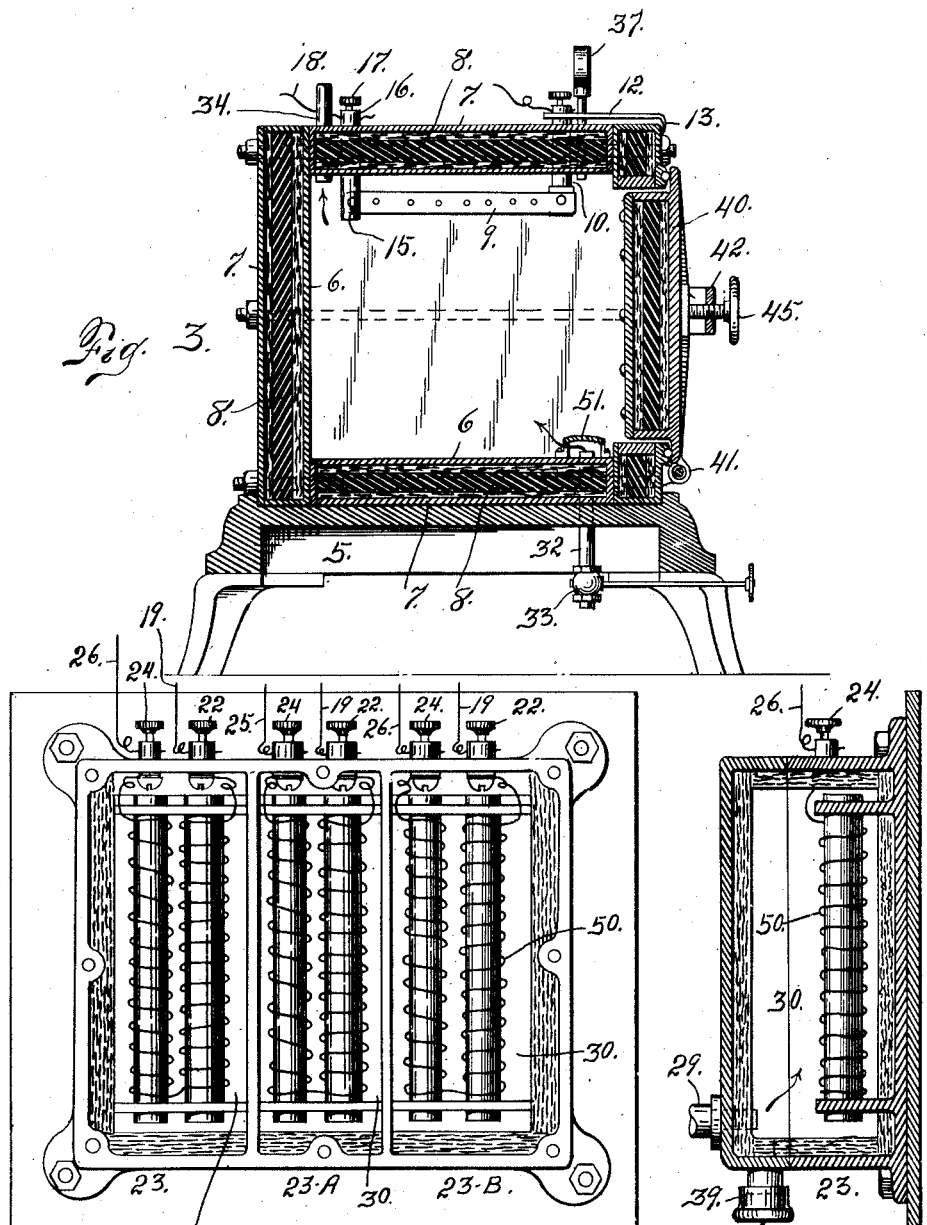

UNITED STATES PATENT OFFICE.

WILLIAM NASH, OF DENVER, COLORADO.

COOKING APPARATUS.

No. 884,288.  Specification of Letters Patent.  Patented April 7, 1908.

Application filed October 23, 1906. Serial No. 340,232.

*To all whom it may concern:*

Be it known that I, WILLIAM NASH, a citizen of the United States, residing in the city and county of Denver and State of Colorado, have invented certain new and useful Improvements in Cooking Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in cooking apparatus in which the articles to be cooked are in the presence of compressed air, the pressure of the air within the ovens being automatically regulated. The apparatus also includes means for producing a circulation of the air through a heating apparatus located outside of the cooking ovens, and also means for automatically regulating the degree of heat in the ovens, through the instrumentality of thermostats located in the circuits of electric heat generators.

The invention will now be described in detail reference being made to the accompanying drawing in which is illustrated an embodiment thereof.

In this drawing, Figure 1 is a top plan view illustrating my improved apparatus provided with three ovens. Fig. 2 is a side elevation of the same. Fig. 3 is a section taken through one of the ovens. Fig. 4 is a view showing an electric heater composed of three elements one for each of the ovens. In this view the face plate is removed from the heater to disclose the heating coils. Fig. 5 is a vertical section taken through the heater.

The same reference characters indicate the same parts in all the views.

Let the numeral 5 designate a suitable stationary base upon which is mounted three ovens which I will designate A, B and C, respectively. These ovens are preferably constructed as shown in Fig. 3 of the drawing, that is to say having their walls composed of interior and exterior plates 6 and 7 provided with a heat insulating filling 8 which may be composed of felt and asbestos or any other suitable filling adapted to retard exterior heat radiation.

In the upper part of each oven is located a thermostat bar 9 composed of two metal plates possessing the property of expansion and contraction in unequal degrees. One extremity of this bar is secured to a spindle 10 which is journaled in the top wall of the oven and protrudes above the same. The exposed extremity of this spindle is provided with an arm 12 terminating in a pointer 13 located adjacent a graduated scale plate 14 (see Fig. 2). The opposite extremity of this bar is located adjacent a contact pin 15 mounted on a contact 16 which also passes through the wall of the oven, its outer extremity being exposed and provided with a binding screw 17 for connecting a circuit wire 18. The spindle 10 is also provided with a similar screw which connects a circuit wire 19 with the spindle 10. The wire 18 leads to a main conductor 20 connected with one pole of an electrical source 21 while the wire 19 leads to a contact 22 of an electrical heater 23. The other contact, namely 24 of this heater is connected with the opposite pole of the electrical source by wires 25, 26 and 27.

As shown in the drawing there are three distinct electrical heaters which I will designate 23, 23ᴬ and 23ᴮ. The thermostat of each oven is connected with one of these heaters and the circuit wires as well as the other elements of the thermostat circuit may be designated by the same reference characters.

When the heat of any oven reaches the limit as indicated by the pointer 13 on the graduated bar, the bar will move away from the contact 15 and break the circuit through the heater. When, however, the oven cools sufficiently to require additional heat, the bar engages the contact 15 and again closes the said circuit thus automatically regulating the degree of heat.

An important feature of my improved construction, consists in the apparatus whereby the air within the ovens is maintained at a predetermined pressure. It has been found by actual demonstration, that in the cooking of meat for instance under a pressure say of thirty pounds to the square inch, that the juices of the meat are retained therein, and that meat so cooked weighs considerably more after cooking than meat cooked under ordinary conditions. This is due to the fact that the pressure of the air within the oven and in contact with the meat, is such as to prevent the escape of the juices and certain other elements which under ordinary circumstances are vaporized and escape from the meat during the cooking operation. In order to maintain this pressure, I employ an air pump connected with each oven, the latter being also provided with a check valve which allows the air to escape after the desired or predetermined pressure is reached. By means of this pump the air is caused to circulate through the oven and also through the electric heater with which the oven is connected, the air being passed around the heating coils which may be of the construction shown in Figs. 4 and 5. This circulation of the air is also an important feature. Any suitable apparatus may be employed for this purpose. In the drawing a pump 28 is connected by means of a pipe 29 with a chamber 30 of one of the electrical heater units (see Fig. 5). The pump is also provided with another pipe designated 31 leading to one of the ovens by a branch pipe 32 the pump being operated to take air from the heater and deliver it to the ovens. As shown in the drawing there are three pumps each of which is provided with a similar connection, the pipes connected with each pump being designated by the same reference characters. In Fig. 2 there are three distinct pipes 31, but on the lower part of the view these pipes are located in the same plane and therefore give the appearance of a single pipe. Each pipe 31 is provided with a valve 33 which may be employed for regulating the supply of air to the oven.

Each oven is provided with a short outlet pipe 34 in which is located a check valve 35 so regulated as to permit the escape of the air from the oven after the pressure reaches the predetermined limit. Beyond the check valve 35 a pipe 36 leads to one of the heater elements. By virtue of this arrangement each pump keeps up a circulation of air through the oven under the desired pressure. The circulation of air through the oven and through the heating chamber 30, maintains the temperature of the oven at the proper degree, this degree being automatically regulated by the thermostat as heretofore explained. Each oven is provided with a pressure gage 37 and a thermometer 38 both of which are exposed to view at the top of the oven. Each heater or each heater unit is provided with an inlet check valve 39 for supplying atmospheric air to the heater whenever the pressure is diminished sufficiently to require additional air. The object of this check valve is to supply any loss of air that may occur incident to leaks in the system. Each oven is provided with a door 40 hinged at its lower edge as shown at 41, and locked in the closed position by a bar 42 pivoted on the oven at one extremity as shown at 43, its opposite extremity being adapted to engage a hoop 44. Each locking bar 42 is provided with a hand screw 45 for tightening the door of the oven sufficiently to make the latter practically air tight. This hand screw is threaded in the bar and bears against the center 46 of the door from which radiate reinforcing webs 47.

As shown in the drawing (see Fig. 1) the pumps are all operated by an electric motor 48 whose shaft 49 is connected in operative relation with the pumps.

From the foregoing description the use and operation of my improved apparatus will be readily understood. The thermostat bars 9 may be first regulated to cause them to leave the contacts 15 when the oven reaches the desired degree of temperature. The motor 48 is then set in motion and the pumps actuated to supply the ovens with compressed air. When this air has attained the desired degree of pressure within the ovens, it is automatically returned to the heating chambers and again passed to the ovens coming in contact with the heating coils 50 of the heat generators. Each oven is interiorly provided with a deflecting plate 51 occupying a position in front of each nozzle or branch pipe 32, whereby the air as it enters the oven is automatically distributed.

The walls of the heat generator are insulated as shown at 23ª, to prevent heat radiation and make the chambers containing the heat generating mechanism, storage reservoirs for the hot air whereby there is practically no loss of heat within the chambers of the generator. This makes the apparatus very economical since the heat is conserved to the greatest possible extent thus cutting down the expense of running the generator and preventing sudden changes of temperature from external influences.

Having thus described my invention, what I claim is:

1. In cooking apparatus, the combination with an oven, of means for supplying the same with hot air under pressure, comprising an air pump connected with the oven, a heater connected with the oven and with the pump, a check valve interposed between the oven and the heater whereby the air is maintained at a predetermined pressure in the oven, the oven, the heater and the pump being connected to cause the air to travel in an endless circuit through the said elements, and means located in the oven for maintaining the heat at a predetermined degree.

2. In cooking apparatus, the combination of an oven, an electrical heater, an air pump, a pipe system connecting all of the said elements whereby the air is circulated by the pump through the oven and heater in an endless circuit, and a check valve interposed between the oven and heater for maintaining the air within the oven at a predetermined pressure.

3. In cooking apparatus, the combination with an oven, of a heater, a pump, an air pipe leading from the heater to the pump, a second air pipe leading from the pump to the oven, and a third air pipe leading from the oven to the heater, the last named pipe being provided with a check valve between the oven and the heater whereby the air within the oven is maintained at a predetermined pressure.

4. The combination with an oven, of a heater, a pump, a pipe system connecting the heater with the pump, the latter with the oven, and the oven with the heater whereby a circulation of hot air by the pump through the oven and heater in an endless circuit may be maintained, and the connection between the oven and the heater being provided with a check valve whereby the air within the oven is maintained at a predetermined pressure.

5. In cooking apparatus, the combination with an oven, an electric heater, an air pump, a pipe system connecting the heater with the pump, the latter with the oven and the oven with the heater, a thermostat connected with the oven and having its movable element located in the circuit of the heater whereby the temperature of the oven may be controlled, and a check valve located in the air pipe between the oven and the heater for regulating the pressure within the oven.

6. The combination with an oven, of a heat generator including a chamber having insulated walls to prevent loss of heat by radiation, a pump, a pipe stem connecting the heater with the pump, the latter with the oven and the oven with the heater whereby a circulation of hot air through the oven and heater in an endless circuit may be maintained, and the connection between the oven and the heater being provided with a check valve whereby the air within the oven is maintained at a predetermined pressure.

7. In cooking apparatus, the combination of an oven, an electrical heater located outside of the oven, a pump, a pipe system connecting the pump, the oven and the heater to cause the air to pass through the said elements in an endless circuit, and means interposed between the oven and heater for maintaining the air within the oven at a predetermined pressure.

8. In cooking apparatus, the combination of an oven, an electric circuit, a heater located in the circuit, a pump, a pipe system connecting the heater with the pump, the pump with the oven, and the latter with the heater whereby the air may be caused to travel through the oven, the heater and the pump in an endless circuit, means located in the oven and connected with the electric circuit whereby the last named circuit may be automatically broken when the heat reaches a predetermined degree within the oven, and a check valve located between the oven and the heater whereby the air within the oven is maintained at a predetermined pressure.

9. In cooking apparatus, the combination of an oven, an electric circuit, a heater located in the circuit, a pump, a pipe system connecting the heater with the pump, the pump with the oven and the latter with the heater whereby the air may be caused to travel through the oven, the heater, and the pump in an endess circuit, a thermostat located in the oven and connected with the electric circuit in which the heater is located, whereby the last named circuit may be automatically controlled by the temperature of the oven, and a check valve located between the oven and the heater whereby the air within the oven is maintained at a predetermined pressure.

In testimony whereof I affix my signature in presence of two witnesses.

WILLIAM NASH.

Witnesses:
DENA NELSON,
OTTO E. HODDICK.